United States Patent [19]

Biggin et al.

[11] 4,379,000

[45] Apr. 5, 1983

[54] PLASTISOLS FOR COATING POLYMERIC MATERIALS

[75] Inventors: Ian S. Biggin, Cardiff; Alan S. Wilson, South Glamorgan, both of Wales

[73] Assignee: BP Chemicals Limited, London, England

[21] Appl. No.: 225,604

[22] Filed: Jan. 16, 1981

[30] Foreign Application Priority Data

Jan. 22, 1980 [GB] United Kingdom ................ 8002130

[51] Int. Cl.³ ........................... C08K 5/01; C08K 5/12
[52] U.S. Cl. ................................... 106/311; 106/316; 524/81; 524/297
[58] Field of Search ................. 106/311, 316; 524/81, 524/297

[56] References Cited

U.S. PATENT DOCUMENTS 2,449,929  9/1948  Corkery ........................... 106/316
2,575,553  11/1951  Kolvoort ......................... 106/316

*Primary Examiner*—John Kight, III
*Assistant Examiner*—Amelia B. Yarbrough
*Attorney, Agent, or Firm*—Brooks, Haidt, Haffner & Delahunty

[57] ABSTRACT

A plastisol composition comprising a mixture of a butyl phthalate and an alkyl benzene in a volume ratio between 90:10 and 40:60 is used, for example, to make conventional plastisol coating formulations. The butyl phthalate is preferably di-isobutyl phthalate and the alkyl benzene can be, for example, dodecyl benzene.

6 Claims, No Drawings

PLASTISOLS FOR COATING POLYMERIC MATERIALS

The present invention relates to plastisols and in particular to plastisols containing a butyl phthalate suitable for coating polymeric flooring material.

Various plastisols have been used as top coats on polymeric flooring materials. However, the choice of a particular plastisol, whether it contains a single plasticizer or a blend of plasticizers, which is most effective technically and economically has created problems. For example, a volatile plasticizer is beneficial in certain cases because depletion of the plasticizer at the wear layer surface leads to increased stain resistance. However, the same volatile loss during service also has a drawback in that it causes differential shrinkage of the wear layer which in turn results in curling. Similarly, if the plasticizer is relatively non-volatile, migration of the plasticizer downwards from the wear layer can be the main cause of curling rather than volatile loss. Moreover, the plasticizer should ideally be such that the plastisol containing the plasticizer not only has a low viscosity but also has good viscosity stability.

To meet these stringent requirements, industry has had to use relatively expensive or unusual plasticizer systems in plastisol compositions. A typical example is a commercial plastisol which contains as plasticizer a relatively expensive mixture of n-butyl benzyl phthalate and 2,2,4-trimethylpentane-1,3-diol di-isobutyrate in an approximate volume percent ratio of 70:30 respectively. This type of mixture has been preferred to the more widely available and relatively inexpensive esters such as di-butyl phthalates because the latter have neither the low plastisol viscosity nor the good viscosity stability of either of the constituents in the mixture referred to above. Similarly, alkyl benzenes such as for instance dodecyl benzene confer low viscosity and good viscosity stability to plastisols but cannot be used as plasticizers on their own because they do not have sufficient compatibility with polymeric materials such as polyvinyl chloride.

However, in spite of the deficiencies associated with butyl phthalates and alkyl benzenes when taken singly, it has now been found that plastisols containing a combination of the two as plasticizer are substantially free from the problems associated with the individual components. Moreover this combination does not adversely affect the physical characteristics and performance of the coated polymeric material.

Accordingly, the present invention is a plastisol composition comprising a mixture of a butyl phthalate and at least one alkyl benzene in a ratio by volume of between 90:10 and 40:60 respectively.

According to a further embodiment the present invention relates to polymeric floor covering material coated with a layer of a plastisol comprising a mixture of a butyl phthalate and at least one alkyl benzene in a ratio by volume of between 90:10 and 40:60 repsectively.

The butyl phthalate may be di-n-butyl phthalate, di-isobutyl phthalate or mixtures thereof. Di-isobutyl phthalate is most preferred.

The alkyl benzene in the plastisol composition may be selected from a mono-, di- or tri-alkyl benzene and diphenyl alkanes and may have straight or branched chains containing between 7 and 17 carbon atoms. The alkyl benzenes may be light alkylates which are produced by oligomerisation of lower olefins followed by alkylation of the benzene nucleus. One such example is dodecyl benzene which is a branched propylene tetramer alkylate. These alkyl benzenes may be used singly or as a mixture. The volume ratio of butyl phthalate to alkyl benzene is preferably between 80:20 and 60:40.

In addition the plastisols may contain other conventional plasticizers such as the higher dialkyl phthalates, n-butyl benzyl phthalate, 2,2,4-trimethylpentane-1,3-diol di-isobutyrate and the like.

The plastisols may also contain other conventional additives such as heat stabilizers and epoxy esters. The plastisols according to the invention can be used for purposes other than wear layers e.g. as part of the plasticizer system in foam layers in which case the plastisol may containg a blowing agent.

The plastisols of the present invention may be applied to multi-layer spread PVC flooring of all types, for example (a) expanded PVC on asbestos paper, (b) expanded PVC on glass fibre-reinforced PVC backed by solid PVC, expanded PVC or expanded polyurethane, and (c) solid PVC on jute.

The polymeric floor coverings may already have a printed layer thereon and in this case the plastisol wear layer is applied on top of the printed layer.

The present invention is further illustrated with reference to the following Examples.

EXAMPLES

The performance of wear layers produced by the plastisols of the present invention (Examples 1 and 2) were compared with a standard commercial plastisol formulation (Comparative Test not according to the invention) which is typical of spread wear layers currently used in the flooring industry. To this end PVC plastisols were mixed to the following formulations using a planetary mixer and de-aerated.

|  | Performance of Wear Layers Produced by | | |
|---|---|---|---|
|  | Comparative Formulation | Example 1 | Example 2 |
| Breon* P130/1 | 80 | 80 | 80 |
| Vinnol* H65V | 20 | 20 | 20 |
| Santicizer* 213 | 30 | — | — |
| Kodaflex* TXIB | 10 | — | — |
| Di-isobutyl phthalate | — | 26 | 26 |
| Alkyl benzene | — | 14 | — |
| Petrene* 900C | — | — | 14 |
| Interstab* M122 | 2 | 2 | 2 |
| Lankroflex* ED6 | 5 | 5 | 5 |

Notes:
Santiciser* 213—'a modified phthalate' (Monsanto Ltd)
Kodaflex* TXIB—2,2,4-trimethylpentane -1,3 diol di-isobutyrate (Eastman Chemical)
Alkyl benzene—dodecyl benzene (highly branched, expropylene tetramer).
Pentrene* 900C—a detergent alkylate co-product (Conoco) which is said to contain a mixture of monophenyl alkanes and diphenyl alkanes.
Interstab* M122— liquid complex soap of Ba/Cd/Zn (Akzo Ltd)
Breon* P130/1—medium viscosity paste - making PVC homopolymer, K value 70, bulk density 250 kg/m$^3$ (BP Chemicals Ltd)
Vinnol* H65V—extender polymer for plastisols - suspension homopolymer, K value 66, bulk density 670 kg/m$^3$ (Wacker).
*Regd. Trade Mark.

An expandable plastisol containing a chemical blowing agent was spread on an asbestos/paper substrate using a gap setting of 0.5 mm. This layer was pre-gelled, without expansion in a Werner-Matthis oven for 18 seconds at an air temperature of 200° C. The wear layer plastisol was spread onto the pregelled expandable layer using a gap setting of 0.4 mm. The wear layer was gelled and foam expansion accomplished at an oven temperature of 200° C. for 54 seconds.

Samples of sheet produced in this way were conditioned for 48 hours at 23° C. They were then subjected to a staining test based on that described in B.S. 5085: Part 1: 1974 (Appendix K). Drops of a solution of a yellow dye in kerosine were applied to the specimen surface for periods of 1 minute, 1 hour and 8 hours. After removal of the staining solution the relative degree of staining of the two wear layers was assessed visually.

Further samples of weighed sheet (dimensions 230 mm×230 mm) were held for 4 weeks at 35° C. in an air-circulated oven. These conditions gave an accelerated indication of the effect of a long period in service. The samples were re-conditioned at 23° C. for a further 24 hours. They were weighed and the vertical lift of the four corners of the sheet placed on a plane horizontal surface was measured. In addition the staining test was repeated for those aged samples.

|  | Performance of Wear Layers Produced by | | |
|---|---|---|---|
|  | Comparative Tests | Example 1 | Example 2 |
| Before ageing | | | |
| Relative stain | Slight stain after 8 hours | No stain | No stain |
| After ageing | | | |
| Relative stain | Slight stain after 1 minute | No stain after 1 hour. Slight stain after 8 hours | No stain after 1 hour. Slight stain after 8 hours. |
| Volatile loss g/m$^2$ | 4.2 | 3.4 | 1.7 |
| Mean corner lift mm | 17 | 19 | 18 |

Inspite of the known lack of viscosity stability of di-isobutyl phthalate, this ester exhibited a remarkable degree of viscosity stability when mixed with an alkyl benzene. The above results show that the floor coverings on which these plastisols were applied as a wear layer showed improved stain resistance, reduced loss of volatilization and only marginally lower curl resistance when compared with proprietary plastisols which use relatively more expensive primary plasticizers.

The plastisols of the present invention contain polyvinyl chloride or other suitable polymer in the conventional proportions, and are preferably PVC plastisols.

We claim:

1. A plastisol composition comprising a mixture of a butyl phthalate and at least one alkyl benzene having one or more straight or branched chains containing between 7 and 17 carbon atoms in a ratio by volume of between 90:10 and 40:60 respectively.

2. A plastisol composition according to claim 1 wherein the butyl phthalate is selected from di-n-butyl phthalate, di-isobutyl phthalate and mixtures thereof.

3. A plastisol composition according to claim 1 or claim 2 wherein the alkyl benzene is selected from a mono-alkyl benzene, a dialkyl benzene, a trialkyl benzene, a diphenylalkane and mixtures thereof.

4. A plastisol composition according to claim 3 wherein the alkyl benzene is dodecyl benzene.

5. A plastisol composition according to claim 1 wherein the volume ratio of butyl phthalate to alkyl benzene is between 80:20 and 60:40.

6. A plastisol composition according to claim 1 wherein the polymeric material component is polyvinyl chloride.

* * * * *